United States Patent

[11] 3,570,631

[72] Inventor Erich Schaftner
 Stuttgart-Zuffenhausen, Germany
[21] Appl. No. 816,259
[22] Filed Apr. 15, 1969
[45] Patented Mar. 16, 1971
[73] Assignee Ernst Heinkel Aktiengesellschaft
 Stuttgart-Zuffenhausen, Germany
[32] Priority Apr. 16, 1968
[33] Austria
[31] A3690/68

[54] DISC BRAKE AND ADJUSTING MEANS THEREFOR
 10 Claims, 4 Drawing Figs.
[52] U.S. Cl. .................................................. 188/71.8, 188/196
[51] Int. Cl. ...................................................... F16d 65/52
[50] Field of Search............................................ 188/71.7, 71.8, 196 (P), 72.4

[56] References Cited
UNITED STATES PATENTS
3,134,459 5/1964 Burnett et al................ 188/196P4X
3,200,911 8/1965 Rumelin....................... 188/196P
3,240,296 3/1966 Gancel......................... 188/196P Primary Examiner—George E. A. Halvosa
Attorney—Michael S. Striker ABSTRACT: A disc brake includes a rotor which is mounted for rotation about an axis in such a manner that under normal operating conditions the rotor has freedom to perform first wobbling movements within a first range of inclination to the axis, and to perform second wobbling movements within a larger second range of inclination to the axis under special second operating conditions. At least one friction pad is mounted proximal to the rotor for movement towards and away therefrom. The friction pad can engage the rotor for braking rotation of the same, and is movable by the rotor to a first spaced position when the rotor performs its first wobbling movements, and to a second farther spaced position when the rotor performs its second wobbling movements. Biassing means permanently biases the friction pad from its second spaced position to its normal first spaced position. Actuating means serves to move the friction pad into engagement with the rotor to normal operative position.

INVENTOR
ERICH SCHAFTNER

DISC BRAKE AND ADJUSTING MEANS THEREFOR

BACKGROUND OF THE INVENTION

The present invention generally relates to brakes, and more particularly to disc brakes. Still more specifically the invention relates to disc brakes utilizing arrangements for maintaining the play between any friction pad or pads and the rotor substantially constant.

It is already known to provide disc brakes wherein a rotor is associated with one or more friction pads, and wherein an arrangement is provided which maintains play between the contact face or faces of the rotor and the friction pad or pads constant in such a manner that the play of the actuating organ associated with the brake, that is the brake pedal or the like which must be depressed by the operator of a vehicle provided with such a brake, will remain constant or at least substantially constant regardless of wearing-away of the friction pad or excessive wobbling or tumbling of the rotor.

The purpose of these arrangements, wherein the rotor is so mounted for rotation about its axis that under normal operating conditions it has freedom to perform first wobbling movements within a first range of inclination to the axis, and under special operating conditions such as traversing of sharp curves or the like the rotor has freedom to perform second wobbling movements within a larger second range of inclination to the axis, is to assure that the play or spacing between the friction pad or pads and the associated contact surface or surfaces on the rotor will be constant. However, constructions which are known in the art for this purpose are not fully satisfactory because they are quite complicated and require large numbers of parts some of which are difficult to manufacture. For this reason these prior art constructions are difficult to assemble and, because of their complicated construction, they are susceptible to malfunction. This latter, of course, brings with it dangers to the vehicle, and its passengers, or at the very least requires servicing and/or repairs.

SUMMARY OF THE INVENTION

The present invention has as its general object to overcome these disadvantages.

More particularly the present invention has as its object to provide a disc brake which is not possessed of the aforementioned disadvantages and which is considerably simpler than the constructions known heretofore.

Further objects of the present invention include the provision of a disc brake which, while it achieves the aforementioned purposes, at the same time is more economical to manufacture and to assemble, and is more reliable in its operation, requiring less maintenance and fewer repairs.

In pursuance of the above objects, and others which will become apparent hereafter, one feature of my invention, briefly stated, resides in the provision of a disc brake wherein a rotor is mounted for rotation about an axis in such a manner that under normal first operating conditions the rotor has freedom to perform first wobbling movements within a first range of inclination to the axis, and under special second operating conditions, it has freedom to perform second wobbling movements within a larger second range of inclination to the axis.

At least one friction pad is mounted proximal to the rotor for movement towards and away therefrom and is arranged to be moved from an operative position of frictional engagement with the rotor to a normal inoperative spaced position by contact with and in response to the rotor performing the first wobbling movements, and to a special inoperative farther spaced position in response to the rotor performing the second wobbling movements thereof.

Biasing means permanently biases the friction pad from the special inoperative position to the normal inoperative position thereof, and actuating means is associated with the friction pad and is operable for urging the same from its normal inoperative position into the position of frictional engagement with the rotor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
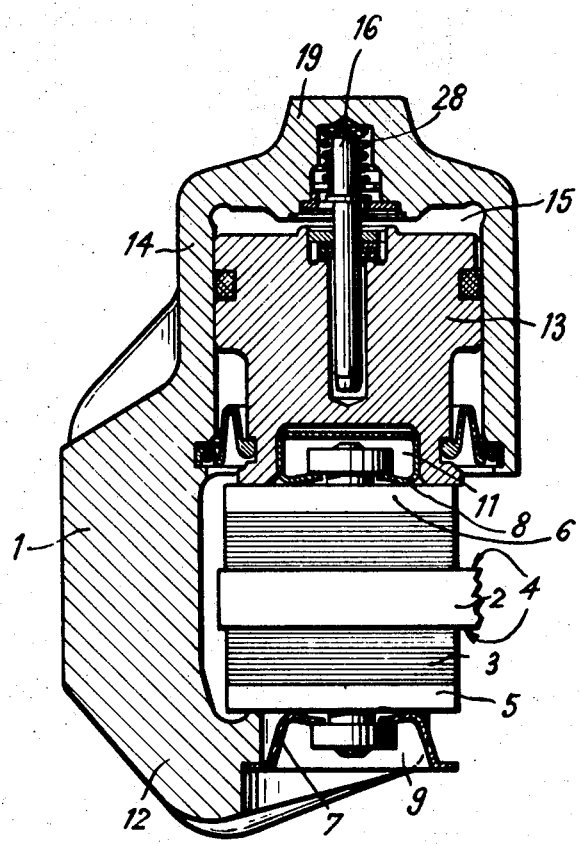
FIG. 1 is a section taken through the upper part of a disc brake according to the present invention.

Discussing the drawing in detail, and firstly FIG. 1 thereof, it will be seen that I have illustrated therein the pertinent portions of a disc brake according to my invention. This disc brake comprises a disc-shaped rotor 2 which is mounted for rotation about an axis paralleling the axis of the pin 16 shown in FIG. 1, but offset towards the right-hand side of the drawing. It is thought that the illustration is clear if it is kept in mind that the rotor 2 is of disc-shaped configuration.

The rotor 2 has opposite axially directed radial contact faces 4 which are juxtaposed with two friction pads 3 of known construction. A carrier member 1 surrounds and straddles a portion of the periphery of the rotor 2 and carries one of the friction pads 3 on its arm 12 to which latter the friction pad 3 is connected via a washer 5 and a spring 7 which is located in a recess 9 in the arm 12. The opposite arm 14 is configurated as a cylinder whose interior is identified with reference numeral 15 and wherein there is mounted for sliding movement a piston 13. The upper friction pad 3 is carried at the exposed front face of the cylinder 13, again being connected thereto via a clamping spring 8 which is mounted in a recess 11 in the front face of the cylinder 13, and a washer 6.

To operate the brake thus far described, a pressure medium is introduced in known manner into the interior space 15 of the cylinder 14, and serves to displace the piston 13 in the direction towards the rotor 2. This results in pushing the friction pad 3 carried by the piston 13 into engagement with the contact face 4, and at the same time pulling the other friction pad 3 into engagement with the opposite contact face 4. When application of pressure medium into the interior 15 of the cylinder 14 is terminated, the normal tumbling or wobbling movement of the rotor 2 about its axis of rotation serves to push the friction pads 3 away from the contact faces 4 and to their normal inoperative position.

However, under certain circumstances, that is such special operating conditions as traversing of sharp curves and the like, the rotor 2 temporarily performs wobbling movements within a greater range of inclination to its axis of rotation than normal. When this occurs, at least one of the friction pads 3, that is the one carried by the piston 13, may be pushed away from the rotor 2 farther than is ordinarily the case. This in turn provides for a longer play in the actuating member which must be operated by the vehicle operator, before the brake will become activated, and this is of course not desirable.

In accordance with the present invention I provide an arrangement for restoring the friction pad 3 which has thus been moved farther away from the rotor 2 under these special operating condition, to its normal spaced position. For this purpose I provide a pin or bolt 16 the rear portion 17 of which is received in a depression 18 provided in the end wall bounding the bore or interior 15 of the cylinder 14. The longer front portion 21 of the pin 16 is similarly received in a bore 22 provided in the piston 13. Blocking members 23 serve to retain the front portion 21 in the piston 13, or rather in the bore 22 provided in the piston 13. These blocking elements 23 are mounted firmly but longitudinally slidably on the front portion 21 of the pin 16 and are held between the end face 24 of an enlarged part of the bore 22 and an annular member 26 which is retained in this enlarged part by the upset bead 27 of the piston 13.

The shorter rear portion 17 of the pin 16 is surrounded by a helical compression spring 28 which abuts against the end surface 29 of the recess 18 on the one hand, and on the other hand against an abutment member 31 so that the pin is shiftably mounted between piston and cylinder via the members 23.

It will be appreciated that under special operating conditions, that is when the rotor 2 performs second wobbling movements within a larger second range of inclination to the axis, the abutment member 31 can be moved in direction towards the end surface 29 of the recess 18 under simultaneous compressing of the spring 28. This is accomplished by the flange 33 a surface 32 of which faces the abutment member 31, and which flange 33 is provided on the pin 16 immovable relative thereto. In nonoperated condition of the brake, that is if no pressure fluid is in the interior 15, 18 of the cylinder 14, the flange 33 is located intermediate the abutment member 31 and a shoulder 34 on the cylinder 14. This position is illustrated in FIG. 3 and it will be appreciated that when at the initiation of braking action the friction pads 3 contact the contact surfaces 4 of the rotor 2, the face 35 provided on the flange 33 will abut against the shoulder 34. This is shown in FIG. 2.

If one or both of the friction pads 3 are shifted to the special inoperative farther spaced position as a result of the rotor 2 performing second wobbling movements within the larger second range of inclination on termination of the braking action and in response to special operating conditions, then the piston 13 and the pin 16 will of course also be pushed away from the rotor 2 by an amount in excess of that normally encountered. In this case the surface 32 will abut against the surface 36 of the abutment member 31 and will shift the latter in direction towards the end surface 29 of the recess 18 while simultaneously compressing the spring 28.

Figure 2:
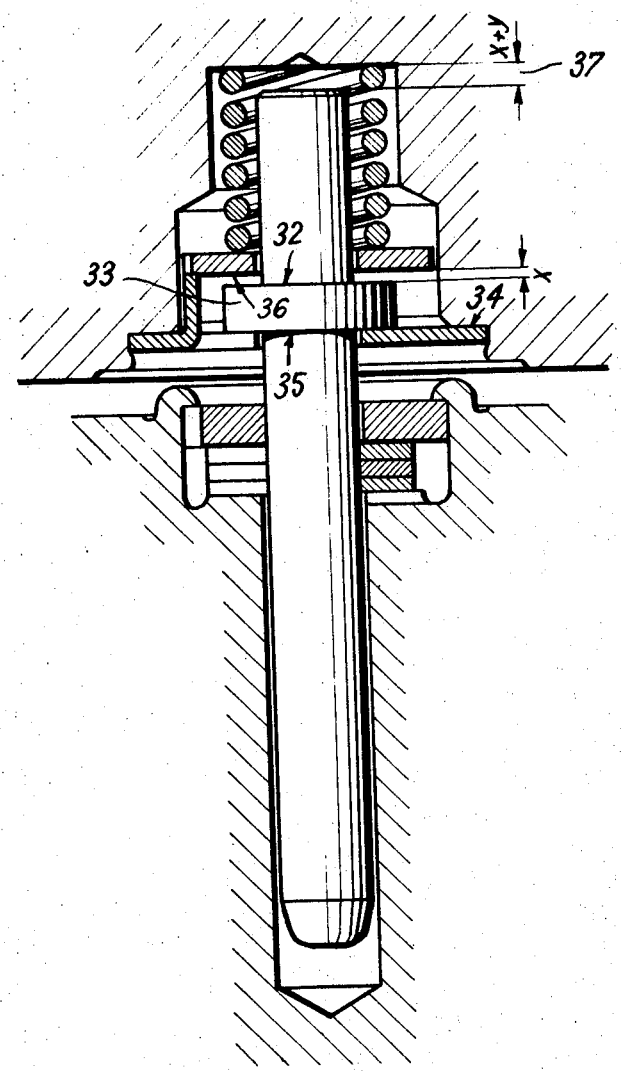
FIG. 2 is a fragmentary enlargement of the section shown in FIG. 1 and illustrating the brake in braking position.
Figure 3:
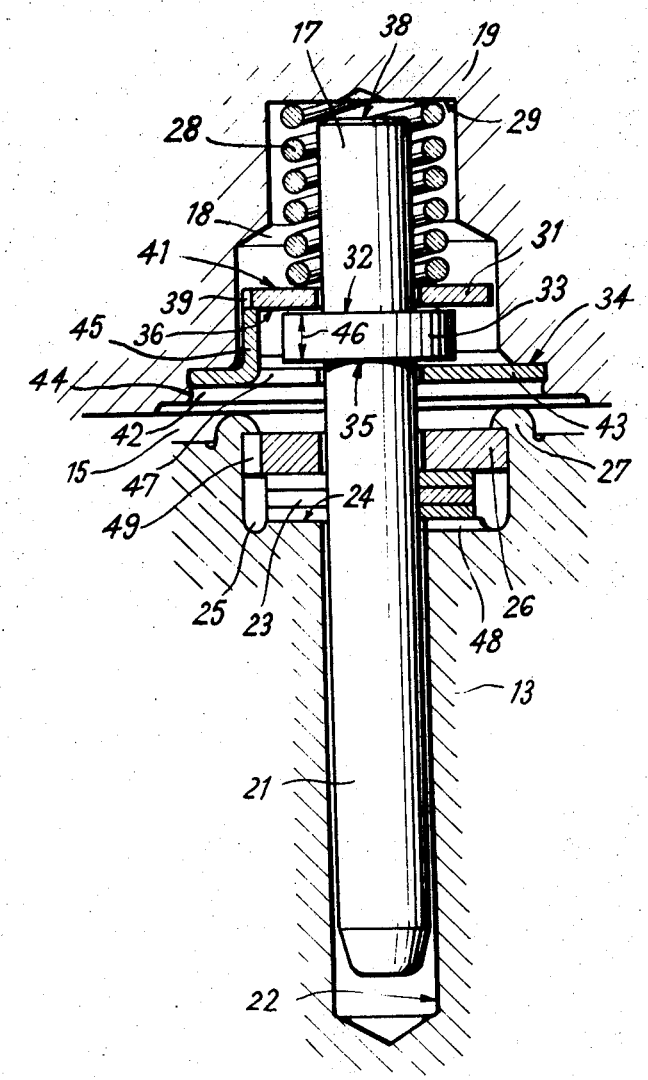
FIG. 3 is a view similar to FIG. 2 but showing the brake in a normal inoperative spaced position.
Figure 4:
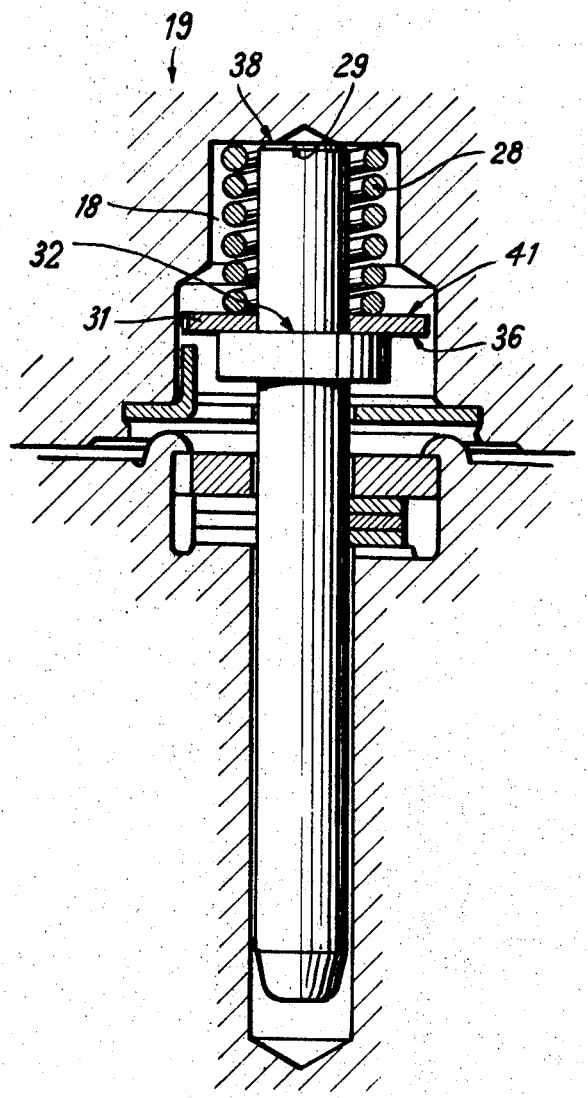
FIG. 4 is a view similar to FIGS. 2 and 3 but showing the brake in a special inoperative farther spaced position.

As shown in the drawing, especially in FIG. 2, a distance x is provided between the abutment surface 32 of the flange 33 and the surface 36 of the abutment member 31. This distance x corresponds to the normal range of inclination of the rotor 2 when the same performs normal wobbling movements. Under the aforementioned special operating conditions the rotor can perform special larger wobbling movements whose maximum range is assumed or empirically determined and identified in FIG. 2 with y. In accordance with the invention the rear end of the portion 17 of the pin 16 is normally spaced from the end surface 29 of the recess 18 by a distance 37 corresponding to the sum of the distances x and y. This means that the pin 16 can be shifted towards the end surface 28 29 to an extent corresponding to the distance 37, that is until its rear face 38 contacts the end surface 29 as shown in FIG. 4. In accordance with the invention it is preferred that the spring 28 be so configurated that when it is compressed as in FIG. 4, its convolutions will still not be in abutment with one another.

As shown particularly clearly in FIG. 3, the abutment member 31 is in form of an annulus which is guided in the recess 18 and is provided in its periphery with cutouts 39 through which air may pass for pressure-equalizing purposes. At the side 41 which faces towards the end surface 29, the spring 28 abuts whereas the abutment face 32 of the flange 33 will abut against the opposite side or surface 36 of the abutment member 31. The shoulder 34 of the cylinder 14 is provided in that the interior of the cylinder is formed with a stepped-shaped recess 42 in which there is located a plate member 43 which is held in place by upsetting the material of the cylinder 14 as shown at 44. The plate member 43, through which the pin 16 extends, is provided with projections 45 extending towards the end surface 29 and having a length which corresponds to the sum of the axial thickness 46 of the flange 33 and the distance x (see FIG. 2). Cutouts 47 provided in the plate member 43 serve to permit passage of air therethrough. This is necessary to assure proper ventilation of the recess 18. Of course, a similar provisions must be made for ventilation of the bore 22 in the piston 13 and the space 25 shown in FIG. 3. For this purpose the end face 24 is provided with grooves 48 and the annular member 26 with kerfs 49.

It will be appreciated that it is within the concept of the present invention to make various modifications. In all such modifications, however, the invention will serve to restore the friction pad or pads to their normal inoperative position that is to the position to which they have been shifted when the rotor 2 resumes normal wobbling movements after braking is terminated from their special inoperative position to which they may have been shifted when the rotor 2 temporarily performs special or second wobbling movements in which its range of inclination to its axis of rotation is greater than under normal operating conditions.

It will be understood that each of the elements described above, or two or more together, may also find a useful application in other types of constructions differing from the types described above.

While the invention has been illustrated and described as embodied in a disc brake, it is not intended to be limited to the details shown, since various modifications and structural changes may be made without departing in any way from the spirit of the present invention.

I claim:

1. In a disc brake, in combination, a disc-shaped rotor having a radial face and being mounted for rotation about an axis in such a manner that under normal first operating conditions the rotor has freedom to perform first wobbling movements within a first range of inclination to said axis, and under special second operating conditions to perform second wobbling movements within a larger second range of inclination to said axis; a mounting element straddling a portion of the rotor periphery and having an arm provided with a blind bore normal to said radial face and having an open end facing the latter; a piston slidably mounted in said bore and having a leading end facing said radial face and a trailing end formed with an axial bore, and pressure means communicating with said blind bore for effecting sliding movement of said piston; at least one friction pad mounted on said leading end of said piston proximal to said rotor for movement towards and away therefrom, said pad being arranged to be moved together with said piston from an operative position of frictional engagement with said rotor to a normal inoperative spaced position by contact with and in response to said rotor performing said first wobbling movements, and to a special inoperative further spaced position in response to said rotor performing said second wobbling movement; and biasing means permanently biasing said friction pad from said special inoperative position to said normal inoperative position, said biasing means comprising an abutment member in said blind bore slidably arranged intermediate an endwall of the latter and said piston and normally located at a rest position spaced from said piston by a predetermined distance corresponding to the difference between said first and second range of inclination, a floating pin freely accommodated in said blind bore and having a front portion at least partially received in said axial bore and a rear portion extending through said abutment member towards said endwall with said pin having a flange arranged to abut against said abutment member for sliding the same toward said endwall in response to movement of said friction pad to said special inoperative position, and a biasing spring bearing against said endwall and said abutment member and urging the latter to said rest position.

2. In a disc brake as defined in claim 2 further comprising an annular limiting member in said bore intermediate said piston and said abutment member, said flange being located intermediate and spaced from said limiting member and said abutment member in nonoperated condition of said actuating means, and abutting against said limiting member in the operated condition of said actuating means.

3. In a disc brake as defined in claim 1, wherein said biasing spring is helical and surrounds said rear part of said pin.

4. In a disc brake as defined in claim 1, said abutment member being an annular member having a peripheral margin provided with pressure-equalization cutouts.

5. In a disc brake as defined in claim 1, said flange being provided at the juncture of said front and rear parts, and the lengths of said front and rear parts being different from one another.

6. In a disc brake as defined in claim 5, said endwall being provided with a recess constituting an extend extension of said blind bore, and said rear part of said pin and said spring being received in said recess.

7. In a disc brake as defined in claim 6, said endwall being provided with a recessed step surrounding the mouth of said recess; and further comprising an annular limiting member received in said recessed step and arranged for abutment thereagainst of said flange when said friction pad is in said normal inoperative position thereof, said limiting member comprising axial projections extending into said recess radially spaced from said flange and having a length corresponding to the sum of the axial thickness of said flange and the distance between said operative and said normal inoperative position of said friction pad.

8. In a disc brake as defined in claim 7, said limiting member being provided with pressure-equalizing cutouts.

9. In a disc brake as defined in claim 6, said recess having an end surface, and said rear part being spaced from said end surface by a distance corresponding to the distance between said operative position and said special inoperative position, when said friction pad is in said operative position.

10. In a disc brake as defined in claim 9, said rear part contacting said end surface when said friction pad is in said special inoperative position, and said spring being at such time in compressed condition; and said spring being helical and being so constructed that its convolutions will still be spaced from one another when said rear part contacts said end surface.